(12) United States Patent
Thorsen

(10) Patent No.: US 6,834,552 B1
(45) Date of Patent: Dec. 28, 2004

(54) FIBRE-OPTICAL STRAIN-GAUGE

(75) Inventor: Per Thorsen, Viby (DK)

(73) Assignee: Vestas Wind Systems A/S, Lem (DK)

( * ) Notice: Subject to any disclaimer, the term of this patent is extended or adjusted under 35 U.S.C. 154(b) by 0 days.

(21) Appl. No.: 10/111,755

(22) PCT Filed: Nov. 3, 1999

(86) PCT No.: PCT/DK99/00596

§ 371 (c)(1),
(2), (4) Date: Apr. 30, 2002

(87) PCT Pub. No.: WO01/33179

PCT Pub. Date: May 10, 2001

(51) Int. Cl.$^7$ .............................................. G01L 1/24
(52) U.S. Cl. ..................................................... 73/800
(58) Field of Search ........................... 73/800, 862.324, 73/862.624

(56) References Cited

U.S. PATENT DOCUMENTS

| | | | | |
|---|---|---|---|---|
| 4,204,742 A | * | 5/1980 | Johnson et al. | 385/23 |
| 4,293,188 A | * | 10/1981 | McMahon | 385/13 |
| 4,300,813 A | * | 11/1981 | Gravel | 385/13 |
| 4,359,637 A | * | 11/1982 | Perren | 250/227.14 |
| 4,611,378 A | | 9/1986 | Caserta et al. | |
| 5,140,155 A | * | 8/1992 | Carome | 250/227.21 |
| 5,224,977 A | * | 7/1993 | Anjan et al. | 65/411 |
| 5,245,400 A | * | 9/1993 | Anjan et al. | 356/73.1 |
| 5,338,929 A | * | 8/1994 | Douma et al. | 250/231.1 |
| 5,812,251 A | | 9/1998 | Manesh | |
| 6,184,797 B1 | * | 2/2001 | Stark et al. | 340/870.07 |

* cited by examiner

*Primary Examiner*—Max Noori
(74) *Attorney, Agent, or Firm*—Stites & Harbison PLLC; Douglas E. Jackson

(57) ABSTRACT

In a fiber-optical strain-gauge of the kind comprising a mechanical construction providing a linear, strain-dependent relative movement of oppositely positioned spaced-apart first and second optical fiber-holding elements in a direction substantially perpendicular to the axial direction of the optical fibers, and in which the varying transmission of light between the two fibers is used as an indication of the strain, the main new feature is that the strain-gauge is manufactured using the following steps: a) prestressing an optical fibre by applying a pulling force, or prestressing the mechanical construction by applying a compressing force; b) fixing said optical fiber to the fiber-holding elements in the mechanical construction; and c) cleaving the optical fiber at the interspace between the fiber-holding elements. With this arrangement the optical fiber ends are aligned in an exact position in a simple manner without using any expensive micromanipulation tools, and a high precision of the gap between the two fiber ends can be provided in a simple manner by controlling the prestressing of the optical fiber, or the mechanical construction.

3 Claims, 2 Drawing Sheets

FIBRE-OPTICAL STRAIN-GAUGE

TECHNICAL FIELD

The present invention relates to a fibre optic strain-gauge of the kind using a mechanical construction providing a linear, strain-dependent relative movement of oppositely positioned spaced-apart first and second optical fibre-holding elements in a direction substantially perpendicular to the axial direction of the optical fibres, in which the varying transmission of light between the two fibres is used as an indication of the strain.

BACKGROUND ART

In strain-gauges of this kind it is known to position two optical fibres oppositely in order to transmit light from one fibre to the other and to provide a strain-dependent relative movement of the fibres, whereby the transmission of light is dependent on the strain. In such systems it is most common to use focusing lenses in order to have a relatively high transmission of light and the use of fibres without any optical elements is setting a high demand on the precisior of the positioning of the fibres which is at least expensive and difficult to achieve. In this connection both alignment and mutual distance between the fibres have to be controlled in an exact manner, in order to achieve a stable correlation between strain and transmission of light. One example of a fibre-optical strain-gauge of this kind is described in U.S. Pat. No. 4,611,378. This document describes a method for positioning optical fibres on fibre-holding elements in alignment about a mechanical quiescent point in the absence of strain. Due to the use of relatively thick fibres, e.g. 0.3 mm 0.6 mm and 1.0 mm in diameter, the demand on the precision of the positioning of the fibres is not very high and this document does not address any of the problems in connection with precise alignment and positioning of the fibres.

U.S. Pat. No. 4,300,813 describes a fibre-optic acoustical transducer. The fibre is mounted under tension to orient the fibre axis along a straight line and at thereafter. The mechanical construction maintains one fibre end face stationary and the other fibre and cantilevered and permits vertical displacement of its end face. The vertical displacement is induced by acoustical waves impinging on a membrane connected to move the cantilevered fibre end. There is no indication in this document suggesting any way of connecting the cantilevered fibre end to provide a measurement of stain in a mechanical construction and, furthermore, no suggestion of providing a movement of both fibre ends in opposite directions perpendicular to the axial direction of the fibres is provided.

Other types of fibre-holding strain-gauges use bending, stretching and compression of the light transmission passage between the optical fibre ends, and is e.g. described in U.S. Pat. No. 5,812,251. Due to the necessary relatively long distance between the optical fibre ends in the constructions described in this document, however, these types of strain-gauges require the use of lenses in order to achieve an acceptable output signal.

DISCLOSURE OF THE INVENTION

It is the object of the present invention to provide a fibre-optical strain-gauge of the kind referred to above, with which it is possible to achieve a very precise alignment and positioning of the two oppositely positioned optical fibres in the strain-gauge construction in a simple manner. With this arrangement an exact alignment of the two optical fibres is automatically achieved in a simple manner and the distance between the two fibre ends can be controlled by controlling the prestressing of the optical fibre, or the mechanical construction, i.e. controlling the applied force.

Preferred embodiments of the fibre-optical strain-gauge are revealed hereafter.

BRIEF DESCRIPTION OF THE DRAWINGS

In the following detailed part of the present description, the invention will be explained in more detail with reference to the exemplary embodiment of a strain-gauge manufactured in accordance with the invention shown in the drawings, in which.

DESCRIPTION OF THE PREFERRED EMBODIMENT

Figure 1:
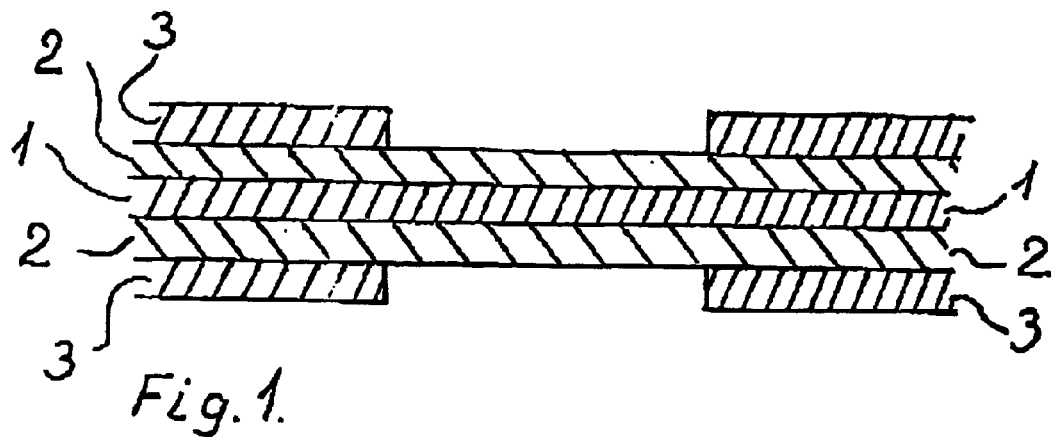
FIG. 1 shows a stripped optical fibre ready to be fixed in the fibre-holding elements in the mechanical construction of the strain-gauge.
Figure 3:
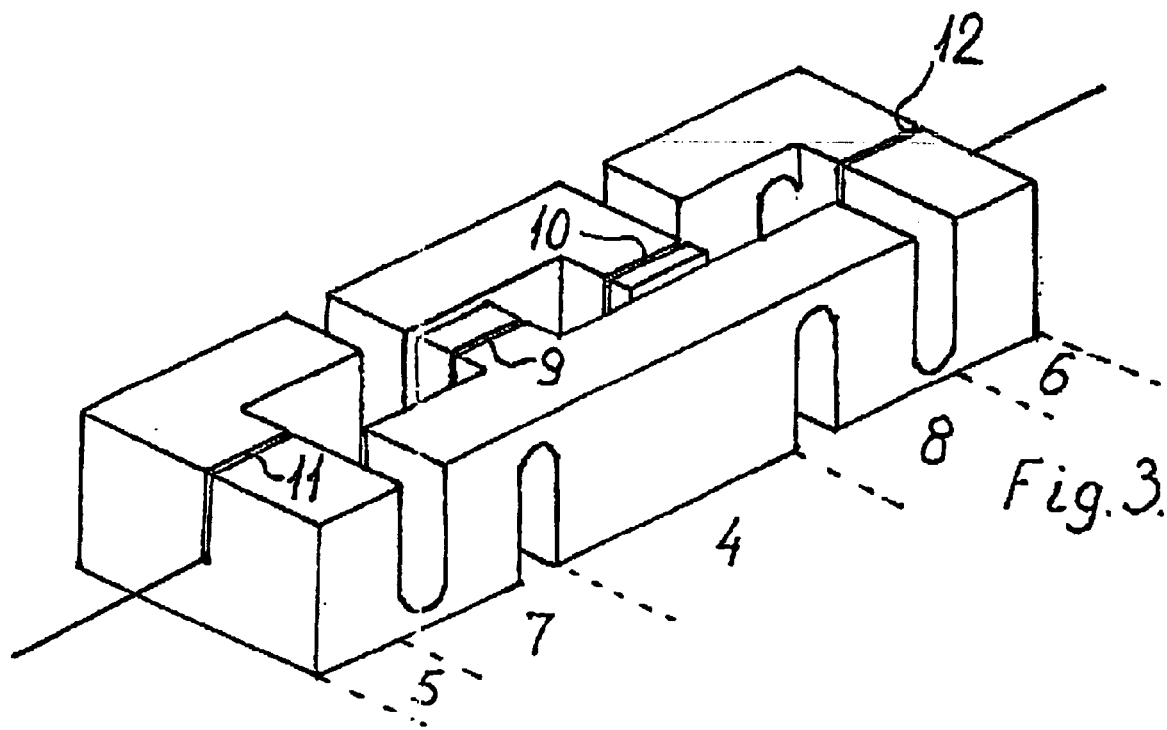
FIG. 3 shows a mechanical construction providing a linear strain dependent relative movement of the two fibre ends.

The optical fibre shown in FIG. 1 has been prepared for use in the method in accordance with the present invention for manufacturing a fibre-optical strain-gauge by stripping of the protective coating 3 in a zone, in which the fibre is to be cleaved after fixing in the mechanical construction as shown in FIG. 3. The optical fibre consists of a core 1 surrounded by a cladding 2 and a protective coating 3.

Figure 2:
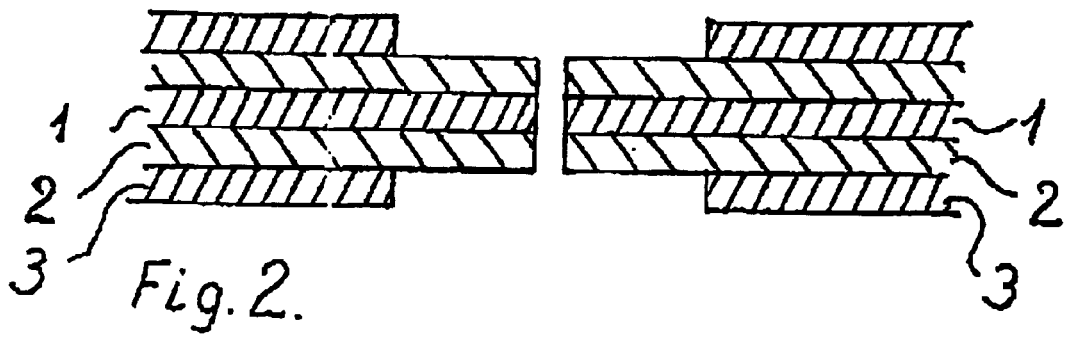
FIG. 2 shows the fibre in FIG. 1 after cleaving.

The optical fibre shown in FIG. 1 is prestressed by applying a pulling force, or the mechanical construction is prestressed by applying a compressing force, and the optical fibre is fixed in the holding elements 9, 10 in the mechanical construction shown in FIG. 3, e g. by gluing. After hardening of the glue the optical fibre is cleaved by scoring the cladding 2 using a hard-metal knife, whereby the optical fibre is cleaved as shown in FIG. 2 and a certain gap is established between the two parts of the cleaved optical fibre. The gap, as shown in FIG. 2, will be dependent on the prestressing of the optical fibre or mechanical construction before fixing, and is preferably approximately 5–60 $\mu$m, more preferred approximately 10–30 $\mu$m and further more preferred 10–20 $\mu$m.

The transmission of light from one part of the fibre to the other across the established gap is dependent on the mutual position of the two fibre ends and in the non-strained condition the fibre ends are, due to the method of manufacturing, positioned exactly aligned, as shown in FIG. 2. The mechanical construction shown in FIG. 3 provides a strain dependent, relative movement of the oppositely positioned optical fibres in a direction substantially perpendicular to the axial direction of the optical fibres whereby the transmission of light between the two fibres can be used as an indication of the strain. The mechanical construction shown in FIG. 3 comprises two fixation zones 5, 6 for fixing the mechanical construction to the surface, the strain of which is to be measured, two double-hinge zones 7, 8 for converting the axial relative movement of the fixation zones 5, 6 into oppositely directed vertical movements of the holding elements 9, 10 positioned in the fibre-holding zone 4. The mechanical construction further comprises grooves 11, 12 in order to be able to position the fibre in the mechanical construction running from one end to the other through the grooves 11, 9, 10 and 12. The fixing of the optical fibre to the holding elements 9, 10 is preferably provided by gluing the optical fibre in the two grooves 9, 10.

Figure 4:
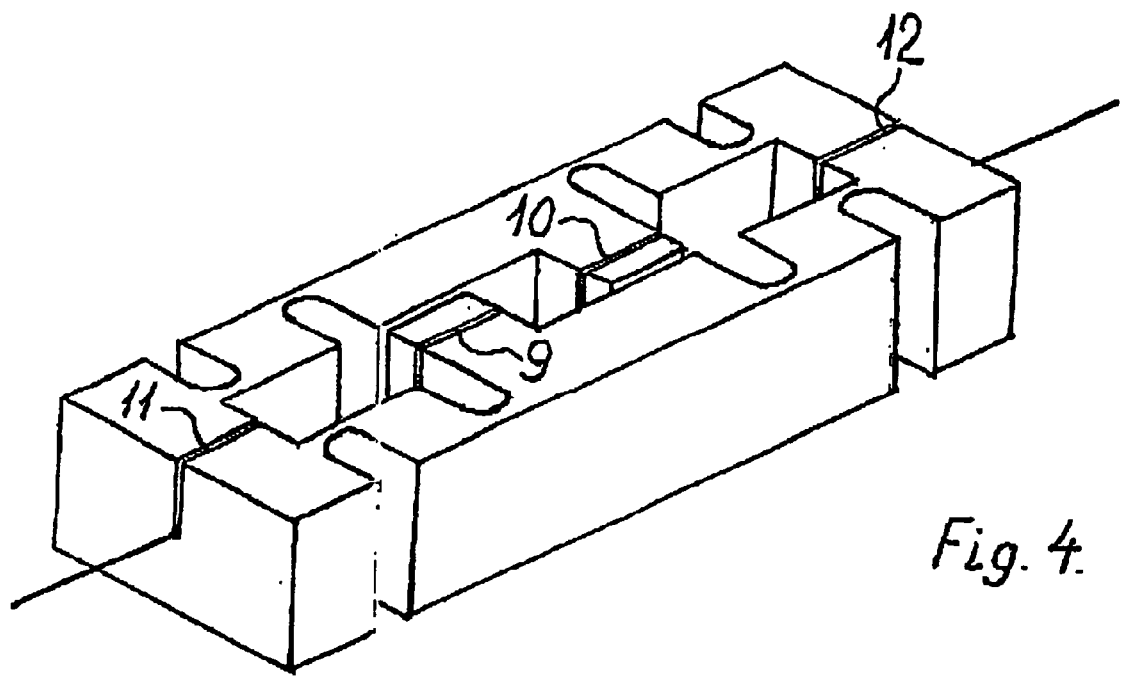
FIG. 4 shows an alternative mechanical construction for providing the linear strain dependent movement of the fibre ends.

The mechanical construction shown in FIG. 4 corresponds essentially to the mechanical construction shown in FIG. 3 but the relative movement of the holding elements 9, 10 is in FIG. 4 in a horizontal direction.

Figure 5:
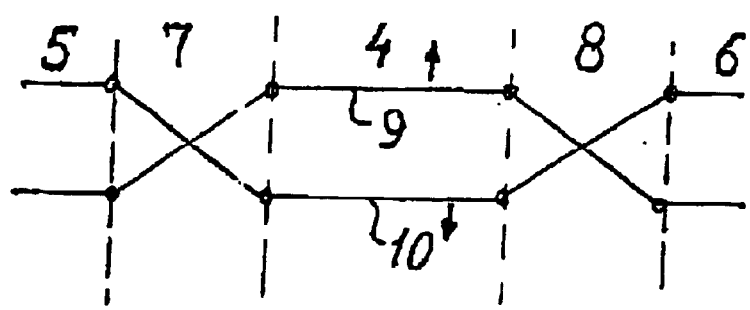
FIG. 5 shows a schematic representation of the mechanical constructions in FIGS. 3 and 4 for explanation of the conversion of the axial movement of the fixation parts into oppositely directed movements of the holding elements.

FIG. 5 is a sketch showing the principle of providing the oppositely directed strain-dependent, relative movements of the fibre-holding elements 9, 10. Movement of the fixation zone 5 towards the fixation zones 6 will by means of the double hinges 7 and 8 be converted into a movement of the holding elements 9, 10 in the direction of the arrows in the fibre-holding zone 4.

It is especially advantageous to have a common thermal expansion coefficient of the construction to be measured on and the mechanical construction of the strain-gauge.

If it is desired to produce a strain-gauge with an offset in the unstrained condition, this can be provided by prestressing the mechanical construction during fixation of the optical fibre, where this prestressing naturally is performed in a direction perpendicular to the mentioned prestressing for providing the air gap between the fibre ends.

In the foregoing, the fibre-optical strain-gauge has been described with reference to the preferred embodiments shown in the figures and it will be obvious to a man skilled in the art, that many modifications can be made within the scope of the following claims without departing from the oasic principle of the invention. Among such modifications it should be mentioned that the mechanical construction could naturally be any construction in which there is provided a strain-dependent, relative movement of the oppositely positioned fibre-holding elements, as long as the fibre can be positioned in the fibre-holding elements and fixed in a prestressed condition before cleaving, and where the mutual position of the fibre ends can be maintained after cleaving, in such a way that the exact alignment of the fibre ends is maintained until the strain-gauge is mounted on the surface, on which to measure.

What is claimed is:

1. A fibre-optical strain-gauge for a construction whose strain is to be measured across first and second construction surfaces thereof, comprising:
    first and second optical fibres; and
    a strain-gauge body including
        first and second body surfaces which are located opposite to one another,
        first and second symmetrically disposed fibre-holding elements in which respective said first and second optical fibres are secured,
        first and second mounting elements for mounting the strain-gauge body to the respective first and second construction surfaces of the construction whose strain is to be measured,
        first and second double hinges which respectively connect said first and second fibre-holding elements to respective said first and second mounting elements,
            (a) said first double hinges having (i) a proximal first hinge thereof which is positioned close to the first fibre-holding elements and which is positioned close to the first body surface of the strain-gauge, and (ii) a distal first hinge thereof which is positioned distant from the first fibre-holding element and which is positioned at a distance from said first body surface, and
            (b) said second double hinges for the second fibre-holding element having (i) a proximal second hinges thereof which is positioned close to the second fibre-holding element and which is positioned close to the second body surface, and (ii) a distal hinges thereof which is positioned distant from the second fibre-holding element and which is positioned at a distance from said second body surface,
    whereby the first and second fibre-holding elements move in opposite directions perpendicular to an axial direction of the fibres when the mounting elements move towards or away from each other.

2. Fibre-optical strain-gauge in accordance with claim 1, wherein the optical fibres are telecommunication optical fibres, with a fibre diameter of approximately 125 $\mu$m.

3. Fibre-optical strain-gauge in accordance with claim 1, wherein a material of the strain-gauge body has a same thermal expansion coefficient as a material of the construction to being measured.

* * * * *